March 26, 1963  W. R. WELTY ETAL  3,083,360
ELECTRONIC SCANNING RADAR SYSTEM
Filed April 1, 1958  4 Sheets-Sheet 1

INVENTORS.
WILLIAM R. WELTY,
BERL D. LEVENSON,
BY Robert H. Himes
AGENT

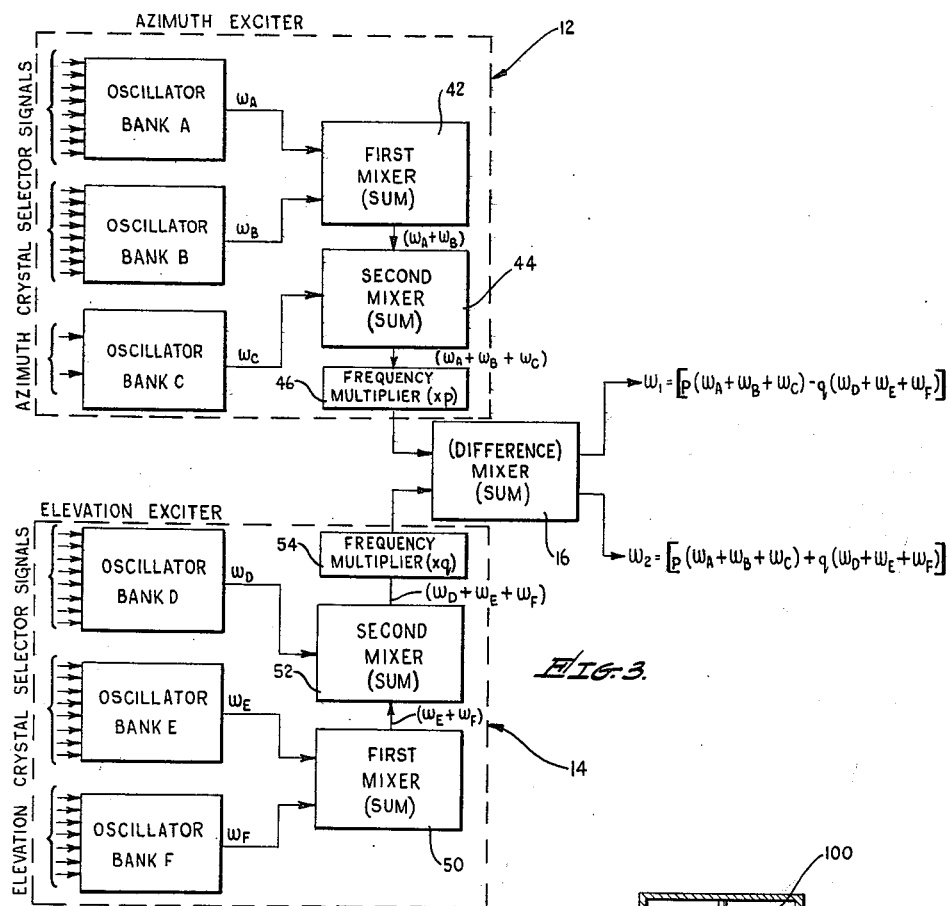
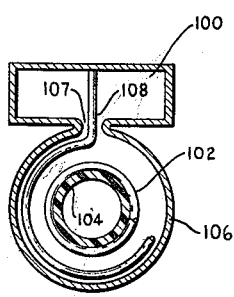
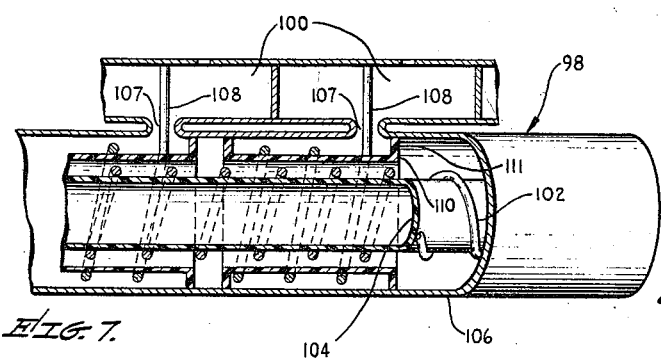
INVENTORS.
WILLIAM R. WELTY,
BERL D. LEVENSON,
BY Robert N. Hines
AGENT

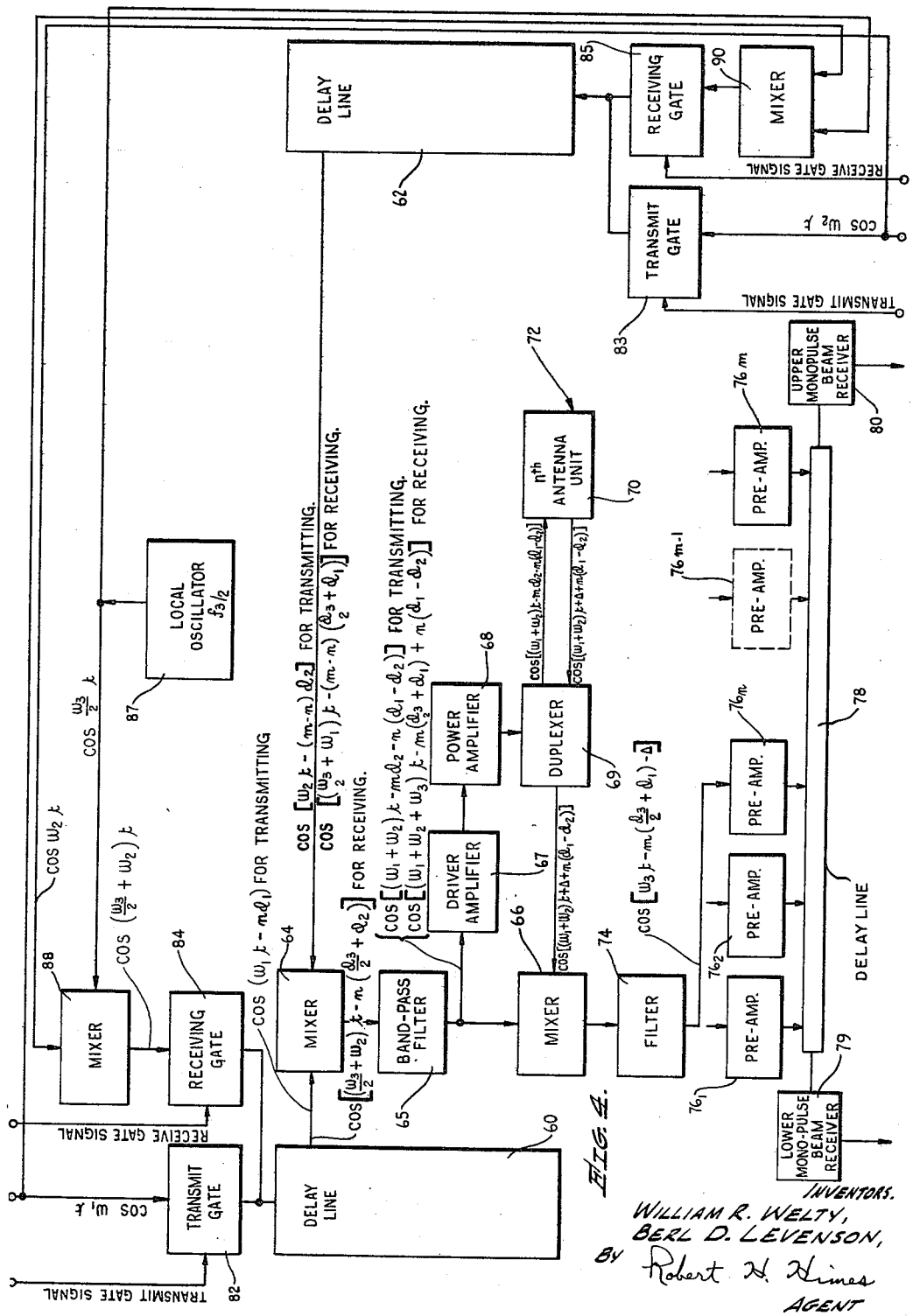

United States Patent Office 3,083,360
Patented Mar. 26, 1963

3,083,360
ELECTRONIC SCANNING RADAR SYSTEM
William R. Welty, Fullerton, and Berl D. Levenson, Los Angeles, Calif., assignors to Hughes Aircraft Company, Culver City, Calif., a corporation of Delaware
Filed Apr. 1, 1958, Ser. No. 725,754
8 Claims. (Cl. 343—5)

This invention relates to electronic scanning radar apparatus and more particularly to radar apparatus capable of transmitting a pencil beam which beam may be electronically scanned in azimuth by controlling the frequency of the radiated energy, and electronically scanned in elevation by independently controlling the phase of individual constituents of the beam.

The radar apparatus of the present invention constitutes a system capable of transmitting and receiving a pencil beam which beam may be electronically scanned through at least one quadrant of azimuth. Thus, in actual application, a four array system could be employed to cover 360 degrees of azimuth, if desired. In accordance with the present invention, the present array system includes an antenna which comprises a number of individual slot radiating elements, these individual slot radiating elements being arranged in vertical and horizontal rows. Each horizontal row of slot radiating elements is coupled to a delay line at periodic points therealong, thereby to provide a horizontal linear array of radiating elements. These horizontal linear arrays are then fed with a plurality of signals of which successive ones have a phase difference which is independently controllable from the frequency. This phase difference determines the elevation angle of the composite transmitted beam. The manner in which the phase difference and frequency are controlled independently of each other form the basis of the present invention and will be hereinafter explained in more detail.

The disclosed radar apparatus is especially adapted to search, track or search-track modes of operation. More particularly, when operating in the track or search-track mode of operation, the present radar apparatus may be adapted to have two simultaneous elevation pencil beams displaced by the order of one elevation beamwidth. The use of simultaneous beams in this manner increases the accuracy with which a target may be tracked and also reduces the time required to track a target to the extent that the apparatus may be designed to time share the search and track modes of operation so that both searching and tracking may be accomplished simultaneously. When tracking a target in this manner, the two simultaneous elevation pencil beams are directed so that the target echoes received by each beam are of the same amplitude.

It is therefore an object of the present invention to provide an improved electronic scanning radar apparatus.

Another object of the invention is to provide radar apparatus capable of transmitting a pencil beam which beam may be scanned in one direction by controlling the frequency of the energy constituting the beam and scanned in an orthogonal direction by independently controlling the phase of the signal elements constituting the beam.

Still another object of the invention is to provide an electronic scanning radar apparatus capable of determining range, azimuth and elevation of surrounding targets.

A still further object of the invention is to provide an electronic scanning radar apparatus capable of providing two simultaneous elevation pencil receiving beams displaced by the order of one elevation beamwidth thereby to effect monopulse tracking of a target in a selected plane with increased accuracy and requiring less tracking time than present day conventional radar systems.

The above mentioned and other features and objects of this invention and the manner of obtaining them will become more apparent by reference to the following description taken in connection with the accompanying drawings, wherein:

FIG. 3 illustrates a schematic block diagram of the azimuth and elevation exciter units of the radar system of FIG. 1;

FIG. 4 illustrates a schematic block diagram of the transmit-receive assembly of the radar system of FIG. 1;

Figure 6:
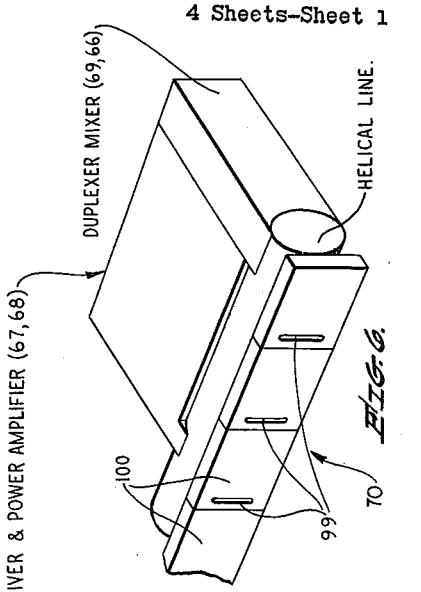
Figure 5:
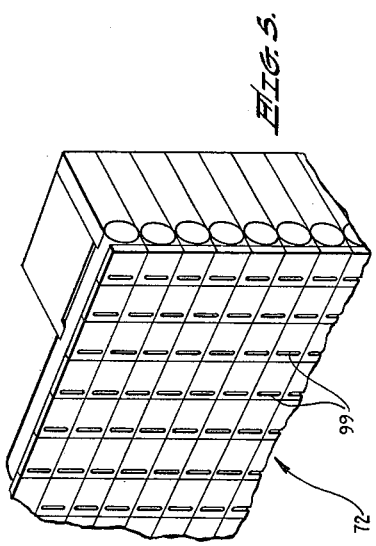

FIGS. 5 and 6 illustrate arrangement of the antenna and other associated units of the transmit-receive assembly shown in FIG. 4; and FIGS. 7 and 8 illustrate a partial sectional perspective view and a cross-sectional view, respectively, of the helical delay line shown in FIGS. 5 and 6.

A general description of the disclosed radar system will first be presented to provide an overall concept of the present invention. This general description will be followed by a more detailed description of the design and operation of the system. In order to point out more clearly the invention, simplifications will be made wherever possible and functions not essential to the basic mode of operation such as, for example, temperature compensation and space stabilization, will be omitted from the description.

The electronic scanning radar system of the present invention is designed to radiate a pencil beam in selected directions without utilizing any moving parts. The realization of this mode of operation necessitates the use of a two-dimensional linear array of radiating elements with adjacent successive radiating elements in each vertical or horizontal row of the array coupled to uniformly spaced points along a transmission line thereby to introduce equal phase differences in the electromagnetic energy radiated from adjacent radiating elements of each of the rows thus coupled to transmission lines. Each row of radiating elements of the array together with its associated transmission line is designated as an "antenna unit." In this respect, it is considered that a length of waveguide having a linear array of slots disposed along a common side thereof and oriented in a manner to radiate substantially equal amounts of energy from within the waveguide constitutes an antenna unit within the spirit and scope of the teachings of the present case. In operation it is only necessary to energize each of the antenna units separately at corresponding extremities in the manner hereinafter described. FIGS. 5–8 illustrate a two-dimensional slot array 72 (a partial view of which is shown in FIG. 5) which is composed of a plurality of antenna units 70 which are designed to operate at a frequency of the order of 200 megacycles per second so as to extend the range of the disclosed radar system. Each antenna unit 70 comprises a horizontal linear array of slot radiating elements 99 which are each individually coupled to a helical coaxial line 98. A more detailed description of the structural details of the antenna array 72 will be hereinafter presented in the specification.

Figure 1:
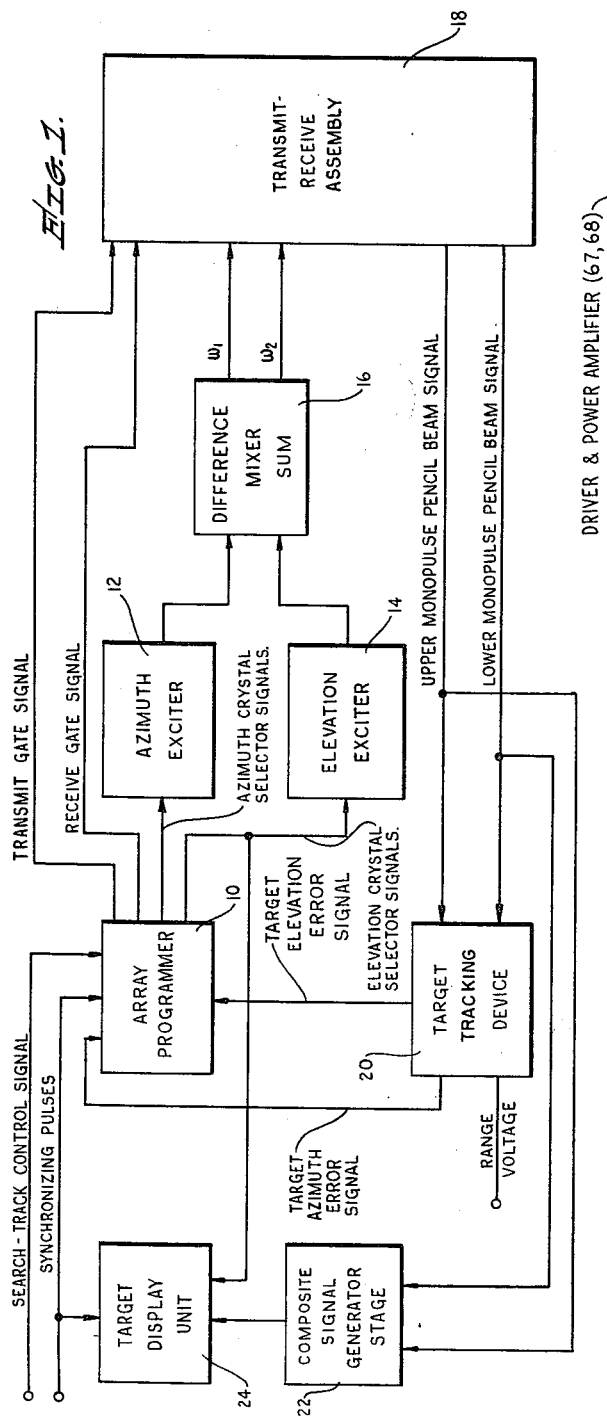
FIG. 1 illustrates a schematic block diagram of the electronic scanning radar system of the present invention.

Referring now to FIG. 1, there is illustrated a block diagram of the electronic scanning radar system of the present invention wherein an array programmer 10 in response to a search-track control signal, target azimuth and elevation error signals and synchronizing pulses applied thereto generates azimuth and elevation crystal selector signals and transmit and receive gate signals. As will be hereinafter explained in more detail, the search-track control signal may cause the array programmer 10 to generate crystal selector signals that are such that the radar system operates in a search mode, a tracking mode, or a search-track mode wherein searching and tracking targets are accomplished on a time-sharing basis. An azimuth exciter 12 and an elevation exciter 14 in response to the azimuth and elevation crystal selector signals, respectively, generate signals which frequency scan the transmitted pencil beam in azimuth and phase shift scan the transmitted pencil beam in elevation in a manner which will be hereinafter explained. As a first step in accomplishing the frequency and phase shift scanning of the transmitted pencil beam, the signals generated by the azimuth and elevation exciters 12, 14 are both applied to a sum-difference mixer 16 which provides output signals which may be represented by $\cos \omega_1 t$ and $\cos \omega_2 t$. In this respect, $\omega_1$ and $\omega_2$ are angular frequencies which are the difference and sum, respectively, of the angular frequencies of the signals generated by the azimuth and elevation exciters 12, 14. The output signals available at the output of the sum-difference mixer 16 together with the transmit-receive gate signals are applied to a transmit-receive assembly 18. The transmit-receive assembly 18 produces a pencil-shaped beam, the azimuth and elevation of which is determined, respectively, by the frequencies of the signals generated by the azimuth and elevation exciters 12, 14. The transmit-receive assembly 18 provides upper and lower monopulse pencil beam signals which constitute the target-echo trains resulting from two pencil beams separated in elevation by less than one elevation beamwidth. The detailed description of the apparatus constituting the transmit-receive assembly 18 together with the manner in which it operates, is presented in connection with FIG. 4.

A target tracking device 20 in response to a signal representatvie of range voltage (source not shown) and the upper and lower monopulse pencil beam signals produces target elevation and azimuth error signals. These error signals are utilized by the array programmer 10 in generating crystal selector signals which correspond to beam positions which result in the target echo returns of both the upper and lower monopulse beam signals being of equal amplitude thereby to track a target in elevation and which additionally result in successive target echo returns being of equal amplitude thereby to track the target in azimuth.

In addition to the above, the upper and lower monopulse pencil beam signals are applied to a composite signal generator stage 22 to produce a composite video elevation signal. This composite video elevation signal is applied, along with synchronizing pulses and the elevation crystal selector signals from which elevation may be derived, to a target elevation display unit 24 which provides a visual presentation of the angle of elevation of target echoes and the instantaneous angle of the cross-over point between the upper and lower monopulse beams. The range tracking phase of the operation of the present system may be of a conventional type and hence is not described in detail. In the case of the target elevation error signal, the target echo signal received by one of the monopulse beams is inverted and compared to the remaining target echo signal to produce a signal representative of the elevation error. The target azimuth error signal, on the other hand, is generated in the same manner except that amplitude changes between successive echo returns from a comman target must be the basis on which the error signal is generated.

Figure 2:
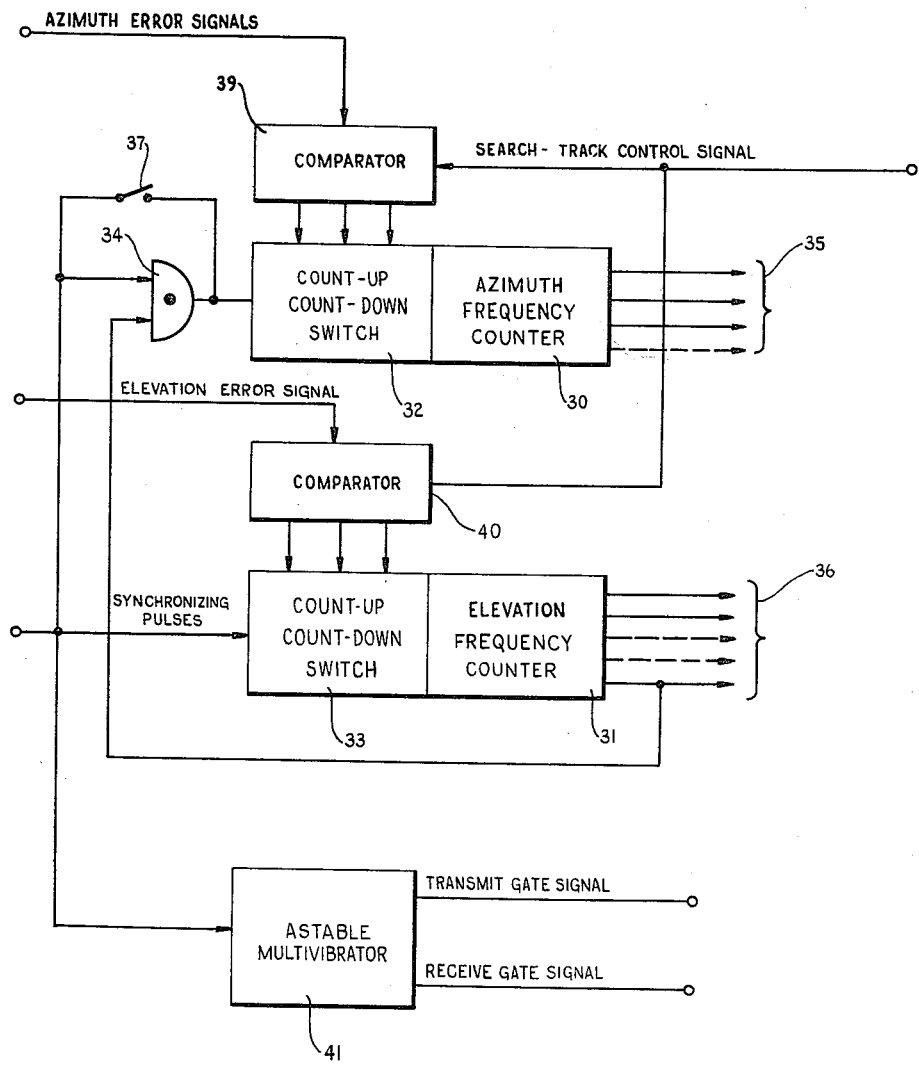
FIG. 2 illustrates a schematic block diagram of the array programmer of the radar system of FIG. 1.

A more detailed schematic block diagram of the array programmer 10 is shown in FIG. 2. Referring to this figure, the array programmer 10 comprises azimuth and elevation frequency counters 30, 31, each of which are adapted to count up or down in response to synchronizing pulses applied thereto, depending upon the orientation of count-up, count-down switches 32, 33, respectively. Synchronizing pulses are applied directly through switch 33 to counter 31 and through an "and" gate 34 and switch 32 to counter 30. Counters 30, 31 are provided with separate output leads 35, 36, respectively, for each number to be stored and are adapted to produce a unidirectional output signal which appears on the respective lead for each number thus stored. The signal corresponding to the number thus produced on each separate output lead constitutes a crystal selector signal. The crystal selector signals produced by azimuth frequency counter 30 appear on leads 35 and are designated as azimuth crystal selector signals. Similarly, the crystal selector signals produced by elevation frequency counter 31 appear on leads 36 and are designated as elevation crystal selector signals. The particular lead of the lead 36 which corresponds to the highest desired count of counter 31 is also connected to the input of "and" gate 34 whereby counter 30 receives only one synchronizing pulse for each full cycle of operation of counter 31. Thus, in a three dimensional search phase of operation, the azimuthal direction of the transmitter beam is not changed until there has been a complete elevation search of each azimuthal direction. For tracking phase of operation, a switch 37 is provided to by-pass the "and" gate 34. One example of a counter of the aforementioned type is described in a copending application for patent Serial No. 624,155, filed November 23, 1956, entitled "Two Pulse MTI Radar System," by Nicholas A. Begovich, now U.S. Patent No. 3,046,547, which application is assigned to the same assignee as is the present case.

The count-up, count-down switches 32, 33 are controlled by comparators 39, 40, respectively. More particularly, the comparators 39, 40 control the orientation of the switches 32, 33, respectively, in such a manner that the counters 30, 31 either don't count or count up or count down in response to synchronizing pulses applied to the inputs thereof. The comparators 39, 40 are each responsive to two control signals, namely, the search-track control signal and the respective target error signal. During the search phase of operation, the comparators 39, 40 in response to the search-track control signal position the switches 32, 33 so that the counters 30, 31 always count in one direction through the cycles of operation thereof During the tracking phase of operation, the comparators 39, 40, in response to the target azimuth and elevation error signals, respectively, position the switches 32, 33 in a manner such that the counters 30, 31 either don't respond or count up or down depending on the magnitude and polarity of the error signals. In this manner, the array programmer 10 generates crystal selector signals which are employed to select signals of a frequency adapted to effect tracking of the target in both azimuth and elevation by the transmitted pencil beam. The azimuth and elevation crystal selector signals are fed to the azimuth exciter 12 and the elevation exciter 14, respectively.

In addition to the above, the array programmer 10 includes a multivibrator 41 which in response to the synchronizing pulses applied thereto generates the transmit and receive gate signals which are applied to the transmit-receive assembly 18. Multivibrator 41 will generally be a two-state device of the type which will assume one state immediately subsequent to each synchronizing pulse and then return to the other state in, for example, of the order of 5–10 microseconds, and remain in this state until it receives the next succeeding synchronizing pulse.

Referring now to FIG. 3, there is shown an example of the manner in which the azimuth exciter 12 and elevation exciter 14 may be designed. Because the exciters 12, 14 must necessarily generate a large number of signals having different predetermined frequencies, it is necessary to use of the order of 25 oscillators in each exciter if crystal control oscillators are to be used rather than, for example, a voltage tuned oscillator. The azimuth exciter 12 generates signals which serve to frequency scan the transmitted pencil beam. The exciter 12 comprises three banks of oscillators A, B and C, banks A and B having eight oscillators each and bank C having two oscillators. Each oscillator of the banks A, B and C is associated with an "or" gate and each crystal selector signal lead connected to the input of only one "or" gate in each of the banks A, B and C so that only one oscillator from any one bank will be switched into a mixing circuit at any one time. Thus, the signals from banks A, B and C are capable of providing a total of 128 different frequencies.

The frequencies of the signals generated by oscillator banks A, B and C are designed by $\omega_A$, $\omega_B$ and $\omega_C$ respectively. The angular frequencies $\omega_A$, $\omega_B$, and $\omega_C$ thus generated are combined by a first mixer 42 and a second mixer 44. In the present disclosure of invention, the term "mixer," unless otherwise specified, is assumed to include a suitable filter so as to reject all but the desired frequencies. The first mixer 42 accepts signals of the frequencies $\omega_A$ and $\omega_B$ from oscillator banks A and B, respectively, to generate an output signal of an angular frequency $(\omega_A+\omega_B)$. This output signal is applied to the second mixer 44 along with the signal of angular frequency $\omega_C$ generated by oscillator bank C to produce a signal of angular frequency $(\omega_A+\omega_B+\omega_C)$. The frequency of this latter signal is multiplied $p$ (a positive integer) times by a frequency multiplier 46 to produce an output signal which is applied to the sum-difference mixer 16.

The elevation exciter 14, on the other hand, comprises three banks of oscillators D, E and F, each of which have eight oscillators. Further, each oscillator of the banks D, E and F is associated with an "or" gate and each crystal selector signal lead is connected to the input of only one "or" gate in each of the banks D, E and F so that only one oscillator from any one bank will be switched into the mixing circuits at any one time. Thus, the signals from oscillator banks D, E and F are capable of providing a total of 512 different frequencies. The frequencies of the signals generated by the oscillator banks D, E and F are combined by a first mixer 50 and a second mixer 52. The first mixer 50 accepts signals from oscillator banks E and F of angular frequencies $\omega_E$, $\omega_F$, respectively. The output signal of angular frequency $(\omega_E+\omega_F)$ thus generated by the first mixer 50 is applied to the second mixer 52 along with the signal of angular frequency $\omega_D$ generated by oscillator bank D. The angular frequency of the signal thus appearing at the output of the second mixer 52 represents the sum of the angular frequencies generated by the oscillator banks D, E and F, namely, $(\omega_D+\omega_E+\omega_F)$. In that the frequency of this signal may be only of the order of 100 megacycles per second, it is multiplied $q$ (a positive integer) times by a frequency multiplier 54 and impressed on the sum-difference mixer 16.

Thus, the signal generated by the azimuth exciter 12 which has an angular frequency of $p(\omega_A+\omega_B+\omega_C)$ together with the output signal generated by elevation exciter 14 which has an angular frequency $q(\omega_D+\omega_E+\omega_F)$ are applied to the sum-difference mixer 16. The sum-difference mixer 16 produces a first signal which has an angular frequency $\omega_1$ equal to the difference in angular frequencies of the signals applied to the mixer 16 and a second signal of an angular frequency $\omega_2$ equal to the sum of the angular frequencies of the signals applied to the mixer 16. As stated above, the angular frequencies $\omega_1$, $\omega_2$ are defined by the following equations:

$$\omega_1 = [p(\omega_A+\omega_B+\omega_C) - q(\omega_D+\omega_E+\omega_F)] \quad (1)$$

$$\omega_2 = [p(\omega_A+\omega_B+\omega_C) + q(\omega_D+\omega_E+\omega_F)] \quad (2)$$

From Equations 1 and 2 it may be noted that the angular frequency $(\omega_1+\omega_2) = 2p(\omega_A+\omega_B+\omega_C)$ is determined solely by the frequency of the signal generated by the azimuth exciter 12 and the angular frequency $$(\omega_2-\omega_1) = 2q(\omega_D+\omega_E+\omega_F)$$

is determined solely by the frequency of the signal generated by elevation exciter 14.

Referring now to FIG. 4, there is shown a schematic block diagram of the transmit-receive assembly 18 wherein the frequency transmitted is equal to the sum of the two independently generated frequencies $\omega_1$ and $\omega_2$ and the phase of the transmitted signal is proportional to the difference of the two independent frequencies. The assembly 18 comprises two delay lines 60, 62 each of which contains $m$ equally spaced outputs and two mixers 64, 66 per each of $m$ antenna units 70 each of which constitutes, for example, a horizontal linear array of slot radiators. Only the $n$th output from delay lines 60, 62 together with its associated apparatus is shown in the drawing. The signals available at the $n$th output of the delay lines 60, 62 are coupled therefrom to the inputs of the mixer 64 to produce a signal which has a frequency equal to the sum of the frequencies available from the delay lines. The signal available at the output of mixer 64 is filtered by a band-pass filter 65 and applied to the mixer 66 as well as through a driver amplifier 67 and a power amplifier 68 to a duplexer 69. The driver amplifier 67 and the power amplifier 68 are adapted to be operative only during a transmit interval, which interval is included within the interval defined by the transmit gate signals. The high power of the signal available at the output of the power amplifier 68 switches the duplexer 69 such that the transmit signal is applied to an antenna unit 70, which unit constitutes the $n$th of $m$ horizontal linear arrays of radiating elements of an antenna 72. During the receiving phase of operation, signals received by the $n$th antenna unit 70 are transferred through the duplexer 69 to the mixer 66 to be mixed with the signal available at the output of mixer 64. The desired signal available at the output of mixer 66 is then isolated by a filter 74 and applied to a preamplifier $76_n$ of preamplifiers $76_1$, $76_2$ ... $76_n$ ... $76_{m-1}$, and $76_m$ associated with the $n$ antenna units 70 of the antenna 72. These output circuits of the preamps $76_1$ ... $76_m$ are coupled in sequence to periodically spaced points along a delay line 78, the extremities of which are connected to a lower monopulse beam receiver 79 and an upper monopulse beam receiver 80.

Transmit and receive signals are successively fed to opposite extremities of the delay lines 60, 62 by means of transmitting gates 82, 83 and receiving gates 84, 85, respectively. The transmitting gates 82, 83 and the receiving gates 84, 85 are energized, respectively, by the transmit gate signal and receive gate signal produced by the multivibrator 41 located as shown in the array programmer 10 of FIG. 2. During the transmit interval, the signal $\cos \omega_1 t$ is applied through the transmit gate 82 to the delay line 60 concurrently with the application of the signal $\cos \omega_2 t$ through the transmit gate 83 to the opposite extremity of delay line 62. These signals of angular frequency $\omega_1$ and $\omega_2$ are available at the output circuits of the sum-difference mixer 16.

During the receiving phase of operation, on the other hand, it is necessary to provide a signal of a frequency characteristic $$\cos \omega_{\tfrac{3}{2}} t$$

which signal is provided by means of a local oscillator 87. This signal $$\cos \omega_{\tfrac{3}{2}} t$$

is applied together with the signal $\cos \omega_2 t$ to the input terminals of a mixer 88 to produce a signal of a frequency characteristic $$\cos \left(\tfrac{\omega_3+\omega_2}{2}\right) t$$

This signal $$\cos \left(\tfrac{\omega_3+\omega_2}{2}\right) t$$

is fed through a receiving gate 84 to the delay line 60 during the receiving phase of operation. In addition to the foregoing, the signal $$\cos \omega_{\tfrac{3}{2}} t$$

together with the signal $\cos \omega_1 t$ is applied to a mixer 90 to produce a signal of a frequency characteristic $$\cos \left(\frac{\omega_3 + \omega_1}{2}\right) t$$

This latter signal $$\cos \left(\frac{\omega_3 + \omega_1}{2}\right) t$$

is fed through a receiving gate 85 to an extremity of delay line 62 during the receiving phases of operation. As is evident from the above, the transmit gates 82, 83 and the receiving gates 84, 85 concurrently switch the delay lines 60 and 62 to either the transmit phase of operation or the receive phase of operation.

The transmit-receive assembly 18 operates in the following manner. During the transmit phase of operation, the signal $\cos \omega_1 t$ is introduced through the transmit gate 82 of the delay line 60. The phase shift $\phi$ between adjacent outputs of the delay line 60 is solely a function of $\omega_1$, whereby the $n$th output of the delay line 60 is $\cos [\omega_1 t - n\phi_1]$. Also, during the transmit phase of operation the signal $\cos \omega_2 t$ is fed through the transmit gate 83 and introduced at the opposite extremity of the other delay line 62. In that there is a phase shift of $\phi_2$ radians between adjacent outputs of the delay line 62, which phase shift is solely a function of the angular frequency $\omega_2$, the $n$th the output of the delay line 62 yields the signal $\cos [\omega_2 t - (m-n)\phi_2]$. The $n$th outputs of both delay lines 60, 62 are combined in the common mixer 64 to produce the output signal $\cos [(\omega_1 + \omega_2)t - m\phi_2 - n(\phi_1 - \phi_2)]$. This latter signal is passed through the band-pass filter 65 and amplified by the driver amplifier 67 and power amplifier 68. The signal is then applied to the duplexer 69 and finally is transmitted by the $n$th antenna unit 70. Simultaneously with this transmission, there is the transmission of the $(m-1)$ corresponding signals from the remaining $(m-1)$ antenna units of antenna 72. At this stage, it is to be noted that the frequency $$\frac{(\omega_1 + \omega_2)}{2\pi}$$

of the transmitted signal will determine the azimuthal direction and the phase difference $(\phi_1 - \phi_2)$ between the signal described and the signals transmitted from adjacent antenna units, that is, the $(n+1)$, $(n+2)$, $(n+3)$ ... $(m-1)$ and $m$ antenna units in one direction and $(n-1)$, $(n-2)$, $(n-3)$ ... 3, 2 and 1 units in the other direction, will determine the elevation angle of the beam. Thus, the angular frequency $(\omega_1 + \omega_2)$ which determines the azimuth angle of the beam is equivalent to $2p(\omega_A + \omega_B + \omega_C)$ which angular frequency is determined solely by the azimuth exciter 12. On the other hand, the phase difference $\phi_1 - \phi_2$ between successive signals is determined by the angular frequency $(\omega_2 - \omega_1)$ which is equivalent to $2q(\omega_D + \omega_E + \omega_F)$ and hence is determined solely by the elevation exciter 14.

The received signal for the $n$th antenna units 70 may be represented by $\cos [\omega_1 + \omega_2)t + \Delta + n(\phi_1 - \phi_2)]$, where $\Delta$ is a phase constant determined by the distance of the target from the antenna 72 which phase constant is the same for all of the units of antenna 72. In the system of the present invention, the receiver local oscillator signals are generated by means of the same two delay lines 60, 62. The principle that the phase difference between adjacent outputs of a delay line is proportional to the frequency is again utilized. For reception, the signal $$\cos \left(\frac{\omega_3 + \omega_1}{2}\right) t$$

produced by the mixer 90 is passed through the receiving gate 85 and introduced to the same extremity of the delay line 62 as was the signal $\cos \omega_2 t$ during the transmitting interval. Thus, during reception, the $n$th output of the delay line 62 yields the signal $$\cos \left[\left(\frac{\omega_3 + \omega_1}{2}\right) t - (m-n)\left(\frac{\phi_3 + \phi_1}{2}\right)\right]$$

Similarly, during reception the signal $$\cos \left(\frac{\omega_3 + \omega_2}{2}\right) t$$

produced by the mixer 88 is passed through the receiving gate 84 and introduced at the same end of the delay line 60 as was the signal $\cos \omega_1 t$. Thus, during reception the $n$th output of the delay line 60 yields a signal $$\cos \left[\left(\frac{\omega_3 + \omega_2}{2}\right) t - n\left(\frac{\phi_3 + \phi_2}{2}\right)\right]$$

the portion of the phase shift $$\frac{\phi_3}{2}$$

between adjacent outputs of the delay lines 60, 62 being solely a function of the incremental frequency $$\frac{\omega_3}{2}$$

The signals appearing at the $n$th output of the two delay lines 60, 62 are applied to the mixer 64 and filtered by the band-pass filter 65 yielding the signal $$\cos \left[(\omega_1 + \omega_2 + \omega_3)t - m\left(\frac{\phi_3 + \phi_1}{2}\right) + n(\phi_1 - \phi_2)\right]$$

This latter signal is the local oscillator signal required for reception from each of the $n$th antenna units 70. The received signal which may be represented as $\cos [(\omega_1 + \omega_2)t + \Delta + n(\phi_1 - \phi_2)]$ is transferred through the duplexer 69 to the mixer 66 together with the corresponding local oscillator signal. The output signals produced by the mixer 66 are passed through the filter 74 thereby to isolate the signal $$\cos \left[\omega_3 t - m\left(\frac{\phi_3 + \phi_1}{2}\right) - \Delta\right]$$

This latter signal is at the receiving intermediate frequency $\omega_3$ and is completely independent of $n$. Hence, all of the signals coming from the separate antenna units 70 may be combined together after being amplified by the respective preamplifier $76_n$ if desired, as they are all of the same frequency and of the same phase. Alternatively, the received signals available at the outputs of the preamplifiers $76_1 \ldots 76_m$ may be combined together in a coherent manner, that is, by introducing appropriate phase differences therebetween consistent with the actual vertical spacing of the corresponding antenna units 70, by coupling the signals to the delay line 78 at uniformly spaced points therealong, as shown in the drawing. The delay produced by the delay line 78 for the intermediate frequency $\omega_3$ is adapted to synthesize two elevation beams which are disposed substantially within the transmitted pencil beam but remain separated by approximately one elevation beamwidth. The coherent addition of the signals thus effected occurs at the extremities of the delay line 78, which extremities are connected to the lower and upper monopulse beam receivers 79, 80 to produce the lower and upper monopulse pencil beam signals, respectively.

When carrying out the above operations, it is necessary to retain the relative phase differences between the $m$ signals which will drive the $m$ antenna units 70 of the antenna 72. One manner of accomplishing this is to dispose the delay lines 60, 62 side-by-side in a manner such that the $n$th outputs from each delay line appears immediately adjacent to the $n$th antenna unit 70. Thus, it is desirable that the $n$th output from each of the delay lines 60, 62 each be the same distance from the $n$th antenna unit 70. Thus, the mixer 64 together with its associated bandpass filter 65 may be mounted directly between the $n$th outputs of the delay lines 60, 62. Also, the driver and power amplifiers 67, 68, the duplexer 69 and the mixer 66 together with its associated filter 74 and preamplifier $76_n$ may be mounted along the input extremities of the antenna unit 70 as shown in FIGS. 5 and 6. Referring to these figures, the antenna 72 comprises, for example, a plurality of horizontally polarized slot radiators 99, each of which is associated with an individual resonant cavity 100. Referring to FIGS. 7 and 8, there is a helical delay line 98 which includes a conductive helix 102 disposed along the back side of each horizontal row of the resonant cavities 100. Each helix 102 is supported about a dielectric sheath 104 which sheath 104 maintains the helix 102 concentrically within a metallic tube 106. An aperture 107 is provided between each cavity 100 and the metallic sleeve 106. Coupling is then provided between each resonant cavity 100 and the helical delay line 98 by means of a helical coupler 108 which extends through the aperture 107 to the opposite side of the cavity 100 and also is disposed about the helix 102 in a manner to couple energy therefrom. The helical coupler 108 may be held in position by means of a dielectric cylinder 110 which cylinder has an outside diameter adapted to accommodate the coupler 108 and which has flanges 111 which have a diameter equal to the inside diameter of the metallic sleeve 106 so as to maintain the dielectric cylinder centered therein. In actual operation, it may be desired that the helical coupler 108 be coupled progressively tighter to the helical delay line 102 in proceeding away from the power source thereby to make the power radiated from the respective slots 99 more uniform. In accordance with the present invention the helical delay line 98 is, of course, coupled to the output of the duplexer 69. In view of normal dispersion which exists along a helical delay line, it is evident that a change in frequency will change the phase difference of energy radiated from successive slots 99 of the cavities 100 and thus change the azimuthal direction of the transmitted pencil beam.

What is claimed is:

1. An apparatus for producing a plurality of output signals of the same frequency, successive ones of said signals having a determinable phase difference, said apparatus comprising means for generating first and second signals having first and second frequencies, respectively, said first frequency being higher than said second frequency; means responsive to said first and second signals for producing a third signal of a frequency equal to the difference between said first and second frequencies and a fourth signal of a frequency equal to the sum of said first and second frequencies; first and second delay lines each having first and second extremities, respectively; means for applying said third signal to said first extremity of said first delay line; means for applying said fourth signal to said second extremity of said second delay line; means for coupling energy from said first delay line at $m$ spaced points therealong numbered in ascending sequence from said first extremity towards said second extremity wherein $m$ is an integer no less than two; means for coupling energy from $m$ points along said second delay line, said $m$ points being numbered in ascending sequence from said first extremity towards said second extremity and being spaced to provide intervals therebetween that are proportional to the electrical distance between like-numbered points of said first delay line; $m$ mixers responsive to the signal energy coupled from said first and second delay lines at each pair of the $m$ pairs of points therealong, respectively, for producing $m$ output signals of the same frequency having said determinable phase difference therebetween.

2. The apparatus as defined in claim 1 which additionally includes means for selecting said first frequency of said first signal, thereby to independently control the frequency of said plurality of output signals.

3. The apparatus as defined in claim 1 which additionally includes means for selecting said second frequency of said second signal, thereby to independently control the phase difference between successive ones of said $m$ output signals.

4. The apparatus as defined in claim 1 which additionally includes an antenna unit comprising $m$ linear arrays of radiating elements, said $m$ linear arrays being coextensively disposed in a common plane; and means for coupling successive output circuits of said $m$ mixers, respectively, to successive ones of said $m$ linear arrays of said antenna unit thereby to generate a pencil-shaped beam of electromagnetic energy.

5. The apparatus as defined in claim 4 including additional means for selectively controlling said first frequency thereby to determine the orientation of said pencil-shaped beam in a plane which parallels said linear arrays of said antenna unit and which is normal to said common plane.

6. The apparatus as defined in claim 4 which includes additional means for selectively controlling said second frequency thereby to determine the orientation of said pencil-shaped beam in a plane orthogonal to said linear arrays and said common plane.

7. An electronic scanning radar system comprising means for generating first and second signals having first and second frequencies, respectively, said first frequency being higher than said second frequency; means responsive to said first and second signals for producing a third signal of a frequency equal to the difference between said first and second frequencies and a fourth signal of a frequency equal to the sum of said first and second frequencies; first and second delay lines each having first and second extremities, respectively; means for applying said third signal to said first extremity of said first delay line; means for applying said fourth signal to said second extremity of said second delay line; means for coupling energy from said first delay line at $m$ spaced points therealong numbered in ascending sequence from said first extremity towards said second extremity wherein $m$ is an integer no less than two; means for coupling energy from $m$ points along said second delay line, said $m$ points being numbered in ascending sequence from said first extremity towards said second extremity and being spaced to provide intervals therebetween that are proportional to the electrical distance between like-numbered points of said first delay line; $m$ mixers responsive to the signal energy coupled from said first and second delay lines at each pair of the $m$ pairs of points therealong, respectively, for producing $m$ output signals of the same frequency having a determinable phase difference therebetween; an antenna unit comprising $m$ linear arrays of radiating elements, said $m$ linear arrays being coextensively disposed in a common plane; means for coupling successive output circuits of said $m$ mixers, respectively, to successive ones of said $m$ linear arrays of said antenna unit thereby to generate a pencil-shaped beam of electromagnetic energy; means for generating a fifth signal of a frequency equal to one-half the frequency of a predetermined intermediate frequency; means responsive to said fourth and fifth signals for producing a sixth signal of a frequency equal to the sum of said first and second frequencies and one-half of said predetermined intermediate frequency; means responsive to said third and fifth signals for producing a seventh signal of a frequency equal to the sum of said first frequency and one-half of said predetermined intermediate frequency less the second frequency; means for applying said sixth signal to said first extremity of said first delay line in place of said third signal and for applying said seventh signal to said second extremity of said second delay line in place of said seventh signal; means coupled to the output of each of said $m$ mixers for isolating $m$ local oscillator signals each of which is of a frequency equal to twice said first frequency plus the predetermined intermediate frequency; a duplexer interposed between each of said $m$ mixers and its corresponding linear array of said antenna unit; and an additional $m$ mixers each of which is coupled to a respective corresponding duplexer and responsive to a respective local oscillator signal for producing $m$ received signals, said received signals being of the same phase and of a frequency equal to said predetermined frequency.

8. The electronic scanning radar system as defined in claim 7 additionally including a third delay line having $m$ input junctions disposed at uniformly spaced points therealong; means for coupling the output of said additional $m$ mixers to successive input junctions of said third delay line; and receiving means coupled to each extremity of said third delay line thereby to synthesize first and second monopulse pencil beam signals.

No references cited.